US011621961B2

(12) United States Patent
He et al.

(10) Patent No.: US 11,621,961 B2
(45) Date of Patent: Apr. 4, 2023

(54) METHOD FOR MANAGING A CLOUD COMPUTING SYSTEM

(71) Applicant: ORANGE, Issy-les-Moulineaux (FR)

(72) Inventors: Ruan He, Chatillon (FR); Xiao Han, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 126 days.

(21) Appl. No.: 16/606,952

(22) PCT Filed: Apr. 13, 2018

(86) PCT No.: PCT/FR2018/050942
§ 371 (c)(1),
(2) Date: Oct. 21, 2019

(87) PCT Pub. No.: WO2018/193191
PCT Pub. Date: Oct. 25, 2018

(65) Prior Publication Data
US 2020/0195649 A1  Jun. 18, 2020

(30) Foreign Application Priority Data
Apr. 21, 2017  (FR) ........................................ 1753493

(51) Int. Cl.
*H04L 9/40* (2022.01)
*G06F 16/906* (2019.01)
(Continued)

(52) U.S. Cl.
CPC ............ *H04L 63/10* (2013.01); *G06F 16/906* (2019.01); *G06Q 10/0631* (2013.01); *G06Q 10/10* (2013.01); *H04L 63/20* (2013.01)

(58) Field of Classification Search
CPC ....... H04L 63/10; H04L 63/20; G06F 16/906; G06Q 10/0631; G06Q 10/10
See application file for complete search history.

(56) References Cited

U.S. PATENT DOCUMENTS

| 6,366,576 B1* | 4/2002 | Haga ....................... H04L 61/00 455/445 |
| 6,968,364 B1* | 11/2005 | Wong ................. H04N 21/8352 348/E7.071 |

(Continued)

FOREIGN PATENT DOCUMENTS

EP       2819052 A1    12/2014

OTHER PUBLICATIONS

International Search Report dated Jul. 2, 2018 for corresponding International Application No. PCT/FR2018/050942, filed Apr. 13, 2018.

(Continued)

*Primary Examiner* — Chris Parry
*Assistant Examiner* — Hassan A Khan
(74) *Attorney, Agent, or Firm* — David D. Brush; Westman, Champlin & Koehler, P.A.

(57) ABSTRACT

A method for managing a cloud computing system, capable of allocating computing and network resources to a plurality of clients, each client being associated with at least one user likely to access the computing and network resources allocated to the client by the cloud computing system. This method includes, for at least one client of the cloud computing system: providing to the client a meta-model having a plurality of elements defining an access control model and an access control policy for the client; receiving an instance of the meta-model provided by the client, this instance defining, for the client, an access control model and an access control policy based on this access control model; and applying the access control policy to control an access of a user of the client to at least one resource allocated to the client by the cloud computing system.

9 Claims, 2 Drawing Sheets

(51) Int. Cl.
  *G06Q 10/0631* (2023.01)
  *G06Q 10/10* (2023.01)

(56) References Cited

U.S. PATENT DOCUMENTS

| | | | | |
|---|---|---|---|---|
| 7,949,123 | B1* | 5/2011 | Flockhart | H04M 3/5238 379/265.06 |
| 9,729,531 | B2 | 8/2017 | He et al. | |
| 10,521,223 | B1* | 12/2019 | Bogushefsky, III | G06F 9/45504 |
| 2003/0182413 | A1* | 9/2003 | Allen | H04L 12/145 709/223 |
| 2005/0257244 | A1* | 11/2005 | Joly | G06F 21/604 726/1 |
| 2006/0149842 | A1* | 7/2006 | Dawson | G06F 9/5072 709/226 |
| 2006/0218156 | A1* | 9/2006 | Schechinger | G06F 16/951 |
| 2007/0136089 | A1* | 6/2007 | Schneider | G16H 40/63 705/2 |
| 2008/0098392 | A1* | 4/2008 | Wipfel | G06F 9/468 718/1 |
| 2008/0244579 | A1* | 10/2008 | Muller | G06F 9/455 718/100 |
| 2008/0320482 | A1* | 12/2008 | Dawson | H04L 41/5009 718/104 |
| 2009/0086945 | A1* | 4/2009 | Buchanan | H04M 3/42289 379/211.01 |
| 2009/0178102 | A1* | 7/2009 | Alghathbar | G06F 21/6218 726/1 |
| 2010/0042720 | A1* | 2/2010 | Stienhans | G06F 9/5072 709/226 |
| 2010/0125473 | A1* | 5/2010 | Tung | G06F 9/5072 709/200 |
| 2010/0153960 | A1* | 6/2010 | Youn | G06Q 10/103 709/224 |
| 2010/0325199 | A1* | 12/2010 | Park | G06F 16/10 709/224 |
| 2010/0332262 | A1* | 12/2010 | Horvitz | G06F 9/5072 705/26.1 |
| 2011/0055385 | A1* | 3/2011 | Tung | H04L 67/1097 718/1 |
| 2011/0055399 | A1* | 3/2011 | Tung | G06F 3/0481 709/226 |
| 2011/0055712 | A1* | 3/2011 | Tung | H04L 43/0876 715/741 |
| 2011/0093847 | A1* | 4/2011 | Shah | G06F 9/45558 718/1 |
| 2011/0145094 | A1* | 6/2011 | Dawson | G06Q 30/06 707/E17.014 |
| 2011/0154353 | A1* | 6/2011 | Theroux | G06F 9/5038 718/104 |
| 2011/0252420 | A1* | 10/2011 | Tung | G06F 9/5072 718/1 |
| 2011/0276686 | A1* | 11/2011 | Tung | H04L 67/1001 709/224 |
| 2011/0282793 | A1* | 11/2011 | Mercuri | G06Q 30/0222 705/347 |
| 2011/0295999 | A1* | 12/2011 | Ferris | H04L 47/70 709/224 |
| 2012/0016721 | A1* | 1/2012 | Weinman | G06Q 30/02 705/7.35 |
| 2012/0016845 | A1* | 1/2012 | Bates | G06F 16/1727 707/E17.005 |
| 2012/0054731 | A1* | 3/2012 | Aravamudan | G06F 8/63 717/170 |
| 2012/0060142 | A1* | 3/2012 | Fliess | G06F 11/3457 717/102 |
| 2012/0066018 | A1* | 3/2012 | Piersol | G06Q 10/10 705/7.14 |
| 2012/0072581 | A1* | 3/2012 | Tung | H04L 67/1008 709/224 |
| 2012/0072910 | A1* | 3/2012 | Martin | G06F 9/45533 718/1 |
| 2012/0096149 | A1* | 4/2012 | Sunkara | G06F 9/5072 709/224 |
| 2012/0124211 | A1* | 5/2012 | Kampas | H04L 47/80 709/226 |
| 2012/0131161 | A1* | 5/2012 | Ferris | G06Q 30/02 709/223 |
| 2012/0131591 | A1* | 5/2012 | Moorthi | G06F 9/5088 718/104 |
| 2012/0158821 | A1* | 6/2012 | Barros | G06F 9/5055 707/769 |
| 2012/0179824 | A1* | 7/2012 | Jackson | H04L 41/5006 709/226 |
| 2012/0179899 | A1* | 7/2012 | Schardt | G06F 30/34 713/2 |
| 2012/0215582 | A1* | 8/2012 | Petri | G06Q 10/0633 705/7.27 |
| 2012/0226808 | A1* | 9/2012 | Morgan | G06Q 30/04 709/226 |
| 2013/0042003 | A1* | 2/2013 | Franco | G06Q 10/0633 709/226 |
| 2013/0046887 | A1* | 2/2013 | Malloy | H04L 41/145 709/224 |
| 2013/0060945 | A1* | 3/2013 | Allam | G06F 9/50 709/226 |
| 2013/0066940 | A1* | 3/2013 | Shao | H04L 67/1025 709/201 |
| 2013/0067090 | A1* | 3/2013 | Batrouni | H04L 67/1097 709/226 |
| 2013/0074189 | A1* | 3/2013 | Boudreau | G06F 21/105 709/224 |
| 2013/0091257 | A1* | 4/2013 | Venugopal | H04L 41/0826 709/221 |
| 2013/0106906 | A1* | 5/2013 | Roche | G06T 11/206 345/629 |
| 2013/0111471 | A1* | 5/2013 | Chandrasekaran | G06F 9/5077 718/1 |
| 2013/0117157 | A1* | 5/2013 | Iyoob | G06Q 30/06 705/26.41 |
| 2013/0185413 | A1* | 7/2013 | Beaty | H04L 67/1001 709/224 |
| 2013/0238572 | A1* | 9/2013 | Prahlad | G06Q 30/0206 707/741 |
| 2013/0304904 | A1* | 11/2013 | Mouline | H04L 43/045 709/224 |
| 2013/0346543 | A1* | 12/2013 | Benantar | G06F 9/5055 709/217 |
| 2014/0068075 | A1* | 3/2014 | Bonilla | H04L 41/0823 709/226 |
| 2014/0136571 | A1* | 5/2014 | Bonvin | G06F 16/2219 707/792 |
| 2014/0229607 | A1* | 8/2014 | Jung | H04L 41/5051 709/224 |
| 2014/0245141 | A1* | 8/2014 | Yeh | G06F 3/0481 715/708 |
| 2014/0278807 | A1* | 9/2014 | Bohacek | G06Q 30/0206 705/7.35 |
| 2014/0278808 | A1* | 9/2014 | Iyoob | G06Q 30/0206 705/7.35 |
| 2014/0279201 | A1* | 9/2014 | Iyoob | G06Q 30/0631 705/26.7 |
| 2014/0280848 | A1* | 9/2014 | Modh | G06Q 40/00 709/223 |
| 2014/0280966 | A1* | 9/2014 | Sapuram | G06Q 30/0629 709/226 |
| 2014/0282525 | A1* | 9/2014 | Sapuram | G06F 3/04842 718/1 |
| 2014/0282536 | A1* | 9/2014 | Dave | G06F 3/04842 718/1 |
| 2014/0324647 | A1* | 10/2014 | Iyoob | G06Q 10/06 705/30 |
| 2014/0344429 | A1* | 11/2014 | Baumann | G06F 1/3209 709/223 |
| 2014/0380048 | A1* | 12/2014 | He | G06F 21/34 713/168 |
| 2015/0012651 | A1* | 1/2015 | Tung | H04L 43/0876 709/224 |

(56) References Cited

U.S. PATENT DOCUMENTS

| | | | |
|---|---|---|---|
| 2015/0058489 A1* | 2/2015 | Tung | H04L 41/5003 709/226 |
| 2015/0193128 A1* | 7/2015 | Luft | G06F 9/45558 715/765 |
| 2015/0206207 A1* | 7/2015 | Narasimhan | H04L 67/1004 705/400 |
| 2015/0228003 A1* | 8/2015 | Iyoob | H04L 41/50 705/26.64 |
| 2019/0014153 A1* | 1/2019 | Lang | H04L 63/20 |
| 2020/0195649 A1* | 6/2020 | He | H04L 63/20 |

OTHER PUBLICATIONS

Written Opinion of the International Searching Authority dated Jul. 2, 2018 for corresponding International Application No. PCT/FR2018/050942, filed Apr. 13, 2018.

Salim Khamadja et al., "Designing Flexible Access Control Models for the Cloud", Security of Information and Networks, ACM, 2 Penn Plaza, Suite 701 New York, NY 10121-0701 USA, Nov. 26, 2013 (Nov. 26, 2013), pp. 225-232, XP058036026.

French Search Report and Written Opinion dated Dec. 7, 2017 for corresponding French Application No. 1753493, filed Apr. 21, 2017.

English translation of the Written Opinion of the International Searching Authority dated Jul. 9, 2018 for corresponding International Application No. PCT/FR2018/050942, filed Apr. 13, 2018.

International Telecommunication Union (ITU), "FG Cloud TR, version 1.0—Part 1: Introduction to the cloud ecosystem: definitions, taxonomies, use cases and high-level requirements", Feb. 2012.

* cited by examiner

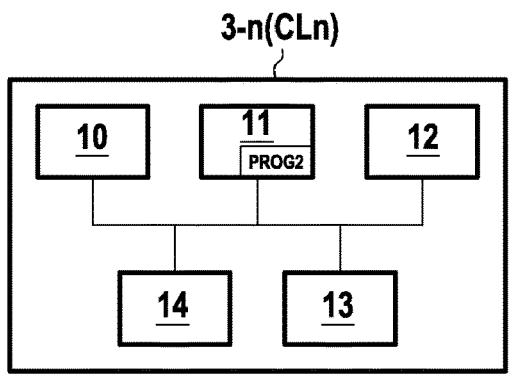
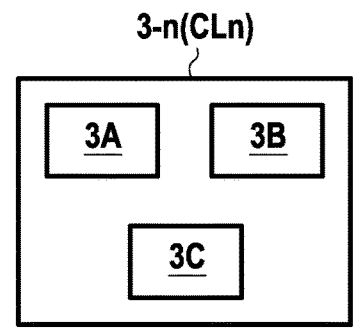
FIG.3A   FIG.3B
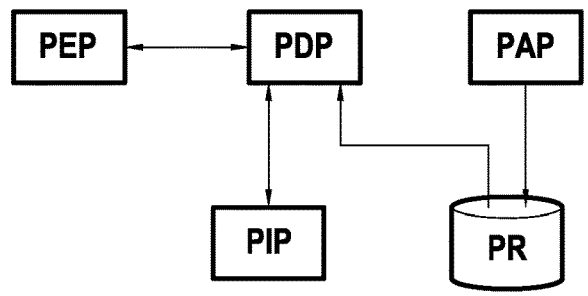
FIG.4
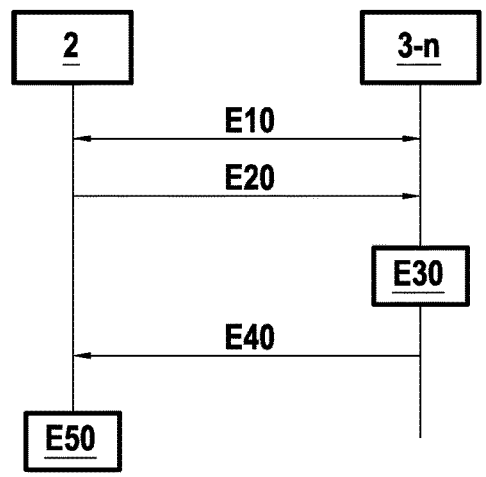
FIG.5

METHOD FOR MANAGING A CLOUD COMPUTING SYSTEM

CROSS-REFERENCE TO RELATED APPLICATIONS

This Application is a Section 371 National Stage Application of International Application No. PCT/FR2018/050942, filed Apr. 13, 2018, the content of which is incorporated herein by reference in its entirety, and published as WO 2018/193191 on Oct. 25, 2018, not in English.

FIELD OF THE INVENTION

The invention relates to the general field of computing systems, in particular computing systems called "cloud computing systems".

It relates more particularly to the control of the access by a user of a client entity of the cloud computing system (also simply referred to as "client" in the description), via a terminal for example, to computing and network resources made available to this client entity by a cloud computing system. By client entity or client of the cloud computing system, is meant here an information system (e.g. computing system of an organization or a company, application, etc.), tenant of the resources made available by the cloud computing system.

BACKGROUND OF THE INVENTION

According to the definition given by the National Institute of Standards and Technology (NIST), the cloud computing is a model that allows users, or more generally clients, to access via a network, on demand and in self-service, computing and network resources such as a storage space, computing power, applications, a network access, software or services, which are virtualized (i.e. made virtual) and shared between these clients. In other words, the computing resources are no longer located on a local server or a user station, but are, in accordance with the cloud computing concept, dematerialized in a cloud composed of several physically remote servers interconnected together, and accessible by the clients and their users via for example a network application. The clients, and especially their users, can access these resources in a scalable manner without having to manage the underlying infrastructure for managing these resources, which is often complex.

The concept of "cloud computing" is described in more detail in the document published by the International Telecommunication Union (ITU) entitled "FG Cloud TR, version 1.0—Part 1: Introduction to the cloud ecosystem: definitions, taxonomies, use cases and high-level requirements", February 2012.

In known manner, the "cloud computing" benefits from numerous advantages:
- flexibility and diversity of the resources that are shared and almost unlimited,
- possible scalability of the resources, provided on demand,
- simple and automated administration of the computing and network infrastructures of companies, and reduction of the administration costs,
- etc.

A major challenge of the concept of "cloud computing" is to guarantee the protection and security of the access to the resources, as these resources are indeed shared by several distinct and heterogeneous clients of the cloud computing system. It is also said of the cloud computing system that it is multi-tenant.

To ensure the security of a cloud computing system, it is necessary to define, for each client of the cloud computing system, an access control model and an access control policy relying on this model for its users and for the resources dynamically and virtually allocated to the client. An access control policy is a set of rules that allows regulating the access of the users to the resources of the client. For example, such an access control policy specifies, via a set of rules, the rights of the users to access different client files stored on a disk; these rules can indicate by way of illustration that the user Bob has read rights on a file F1.h and that the user Alice has write rights on a file F2.c. This access control policy relies on an access control model that defines how the decision to authorize or not the access to the resource is made.

In the state of the art, there are many access control models that allow supervising the use of the resources of a client: these models are generally designed to check whether an active entity (also referred to as subject) such a user via a terminal, can access a passive entity (also referred to as object) such as a computing and network resource, by performing a given operation (also referred to as an action), and where necessary, authorize the access to the passive entity by the active entity via said operation. More or less complex known access control models are, for example, the RBAC (Role-Based Access Control), OrBAC (Organization-Based Access Control) or MLS (MultiLevel Security) models.

These models were basically designed to manage the access control in a computing system associated with the same entity. The cloud computing systems today rely on these models, but select a single one that they impose uniformly on each of their clients. In other words, all the clients of a cloud computing system define their access control policies by relying on the same access control model chosen by the operator of the cloud computing system, such as for example on the OrBAC or RBAC model.

Such a rigid configuration is obviously not well suited to the current landscape of the information systems and telecommunications that promotes the emergence of multiple actors and applications caused to share computing and network resources via cloud computing systems, these multiple actors and applications having separate needs in terms of security policies and more particularly of access control policies.

SUMMARY OF THE INVENTION

The invention allows overcoming in particular this drawback by proposing a method for managing a cloud computing system, able to allocate computing and network resources to a plurality of clients, each client being associated with at least one user likely to access computing and network resources allocated to the client by the cloud computing system, said method comprising, for at least one client of the cloud computing system:
- a step of providing, to said client, a meta-model comprising a plurality of elements allowing to define an access control model and an access control policy for the client;
- a step of receiving an instance of the meta-model provided by the client, said instance defining for said client an access control model and an access control policy based on this access control model; and a step of applying said access control policy to control an access of a user of the client to at least one resource allocated to the client by the cloud computing system.

Correlatively, the invention also relates to a cloud computing system able to allocate computing and network resources to a plurality of clients, each client being associated with at least one user likely to access the computing and network resources allocated to the client by the cloud computing system, said system comprising:

- a provision module, configured to provide at least one client of the cloud computing system with a meta-model comprising a plurality of elements allowing to define an access control model and an access control policy for the client;
- a receiving module, able to receive an instance of the meta-model provided by the client, said instance defining for said client an access control model and an access control policy based on this access control model; and
- a security module configured to apply said access control policy to control an access of a user of the client to at least one resource allocated to the client by the cloud computing system.

The invention therefore proposes that, instead of imposing the same access control model on all its clients, the cloud computing system provides them with a predefined meta-model enabling each of the clients of the cloud computing system to create his own access control model and base its access control policy on the model thus created.

This new paradigm in terms of access control in a cloud computing context is particularly flexible and allows each client to define with more freedom an access control policy that is specific to the client and adapts to his specificities and needs in terms of security.

This definition is done on-the-fly (in a dynamic way) by the client from the meta-model provided by the cloud computing system: the meta-model generically defines a number of elements allowing to create an access control model and to specify an access control policy relying on this model, that the client instantiates with the cloud computing system (in other words, he informs the elements of the meta-model to create the access control model on which he wishes to base his access control policy).

Thus, instead of protecting the cloud computing system as a whole via a single access control model, the invention makes it possible to limit and adapt the scope of the protection to each client. Each client can have a customized control of the access to the resources dynamically and virtually allocated to the client by the cloud computing system.

It is noted that this way of managing the control of the access to the resources at the cloud computing system level is particularly well adapted to the scalable nature of the resources and clients within a cloud computing system. Just as an access control model and policy can be created on-the-fly for a client of the cloud computing system, these can be removed on-the-fly when this client is no longer served by the cloud computing system.

The new paradigm proposed by the invention is therefore flexible, dynamic, adaptive and scalable.

Although the invention makes it possible to define a plurality of distinct access control models and policies for each of the clients of the cloud computing system, it nevertheless relies on a single meta-model common to all the clients, and a control of access to the resources centrally carried out by the cloud computing system. This allows ensuring the consistency of the control of access to the resources provided by the implemented cloud computing system and enhances its effectiveness. In addition, if the resources allocated to a client are distributed over a plurality of separate data centers, the same access control policy is then applied by each of the data centers.

It should be noted that the clients of a cloud computing system can, via the meta-model provided by the cloud computing system, base their access control policy on a known access control model. Thus, in one particular embodiment of the invention, the instance of the meta-model provided by the client defines an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type.

The invention also allows creating new access control models, or adapting the existing access control models by introducing new characteristics into these models (e.g. addition of new entities to the models, definition of new attribute categories associated with these entities, introduction of concepts in the known access control models such as the concept of session, delegation, hierarchy, usage control, etc.), allowing to integrate advanced and unprecedented features in the access control carried out.

To this end, as mentioned above, the meta-model proposed by the cloud computing system to its clients advantageously comprises a plurality of elements allowing to define the access control model adopted by the client for its access control policy. In one particular embodiment, the plurality of elements of the meta-model comprises:

- a perimeter of the access control model defining a plurality of entities involved in the access control policy of the client. For example, the plurality of involved entities comprises at least one subject, and/or one object and/or one action;
- metadata defining, for each entity, at least one attribute category associated with that entity;
- data defining possible values for each attribute category defined by the metadata;
- at least one meta-rule identifying at least one attribute category defined by the metadata and used to provide an instruction in accordance with the access control policy of the client;
- at least one access control rule based on said at least one met-rule and providing an instruction in accordance with the access control policy of the client; and
- a set of values assigned by the client to each entity defined for this client in the perimeter of the access control model, for each attribute category associated with this entity and comprised in a meta-rule, said assigned values being selected from the data.

These different elements form a generic meta-model that provides a flexible framework allowing to create access control models and define a wide variety of access control policies.

Thus according to another aspect, the invention also provides a computer file comprising instructions describing a meta-model comprising a plurality of elements allowing to define an access control model and an access control policy for a client of a cloud computing system able to allocate computing and network resources to a plurality of clients, said plurality of elements of the meta-model comprising:

- a perimeter of the access control model defining a plurality of entities involved in the access control policy of the client;

metadata defining, for each entity, at least one attribute category associated with that entity;

data defining possible values for each attribute category defined by the metadata;

at least one meta-rule identifying at least one attribute category defined by the metadata and used to provide an instruction in accordance with the access control policy of the client;

at least one access control rule based on said at least one meta-rule and providing an instruction in accordance with the access control policy of the client; and a set of values assigned by the client to each entity defined for this client in the perimeter of the access control model, for each attribute category associated with this entity and comprised in a meta-rule, said assigned values being selected from the data.

It is noted that the meta-model proposed by the invention relies in this particular embodiment on a specification based on the concept of attributes. The relevance of this approach to describing many access control models has been demonstrated, as the different properties of the entities (subject, object or action) in terms of security can be considered as attributes associated with these entities.

Thus, in one particular embodiment, at least one attribute category defined for an entity is selected from:
- a security level (e.g. level of security of a subject or object);
- a role (e.g. role of a subject);
- a type (e.g. type of object);
- a field (e.g. field to which a subject has access).

In one particular embodiment, at least one instruction provided by a rule comprises an authorization or a denial of an access to a determined resource allocated to the client by the cloud computing system.

Thus, the invention, through the meta-model proposed to the client, allows the latter to define a conventional access control policy by means of rules authorizing or denying the access to a resource depending on the values of the attributes associated with one or several entities.

In one particular embodiment, the instance of the meta-model is provided by the client via a configuration interface of the cloud computing system common to the plurality of clients of the cloud computing system.

Since the meta-model proposed by the cloud computing system is common to all the clients of the cloud computing system, it can be advantageously instantiated via a unified control interface for all the clients.

Thus, in view of the foregoing, the invention relies on a meta-model provided by a computing system to its clients in order to define their own access control models and on the computing system per se able to provide such a meta-model. The invention also relies on the device used by each client to instantiate the meta-model proposed by the cloud computing system and thereby create the access control model it wants to see applied to its users.

According to another aspect, the invention therefore also relates to a method for instantiating, by a client, a cloud computing system able to allocate computing and network resources to a plurality of clients, each client being associated with at least one user likely to access computing and network resources allocated to the client by the cloud computing system, said method comprising:

a step of obtaining a meta-model provided by the cloud computing system and comprising a plurality of elements allowing to define an access control model and an access control policy for the client;

a step of instantiating the meta-model creating an instance defining for said client an access control model and an access control policy based on this access control model; and a step of providing said instance to the cloud computing system.

Correlatively, it relates to a device of a client of a cloud computing system able to allocate computing and network resources to a plurality of clients, each client being associated with at least one user likely to access the computing and network resources allocated to the client by the cloud computing system, said device comprising:

an obtaining module, configured to obtain a meta-model provided by the cloud computing system and comprising a plurality of elements allowing to define an access control model and an access control policy for the client;

a module for instantiating the meta-model, configured to create an instance of the meta-model defining for said client an access control model and an access control policy based on this access control model; and a provision module, configured to provide said instance to the cloud computing system.

The instantiation method and the device of the client of the cloud computing system benefit from the same advantages mentioned above as the management method and the cloud computing system.

In one particular embodiment, the various steps of the management method and/or of the instantiation process are determined by computer program instructions.

Accordingly, the invention also relates to a computer program on a storage medium, this program being likely to be implemented in a cloud computing system or more generally in a computer, this program including instructions adapted to the implementation of the steps of a management method as described above. The invention also relates to a computer program on a storage medium, this program being likely to be implemented in a device of a client of a cloud computing system or more generally in a computer, this program including instructions adapted to the implementation of the steps of an instantiation method as described above.

Each of these programs can use any programming language, and be in the form of source code, object code or intermediate code between source code and object code, such as in a partially compiled form or in any other desirable form.

The invention also relates to a computer-readable storage or recording medium and including instructions of a computer program as mentioned above.

The storage or recording medium may be any entity or device capable of storing the program. For example, the medium may include a storage means, such as a ROM, for example a CD ROM or a microelectronic circuit ROM, or a magnetic recording medium, for example a floppy disc or a hard disk.

On the other hand, the storage or recording medium may be a transmissible medium such as an electrical or optical signal, which may be conveyed via an electrical or optical cable, by radio or by other means. The program according to the invention can be particularly downloaded on an Internet type network.

Alternatively, the storage or recording medium may be an integrated circuit in which the program is incorporated, the circuit being adapted to execute or to be used in the execution of the method in question.

The invention also relates to a system comprising:
- a cloud computing system according to the invention, able to allocate computing and network resources to a plurality of clients, each client being associated with at least one user likely to access the computing and network resources allocated to the client by the cloud computing system; and
- a plurality of devices of the clients of the cloud computing system according to the invention.

It is also possible to consider, in other embodiments, that the management method, the instantiation method, the cloud computing system, the device of a client of the cloud computing system and the system according to the invention have in combination all or part of the aforementioned characteristics.

SHORT DESCRIPTION OF THE DRAWINGS

Other characteristics and advantages of the present invention will become apparent from the description given below, with reference to the appended drawings illustrating an example of embodiment with no limitation. In the figures:

FIG. 3A represents the hardware architecture of the client devices of FIG. 1;

FIG. 3B represents various operating elements of the client devices of FIG. 1 configured to implement the instantiation method according to the invention;

Figure 1:
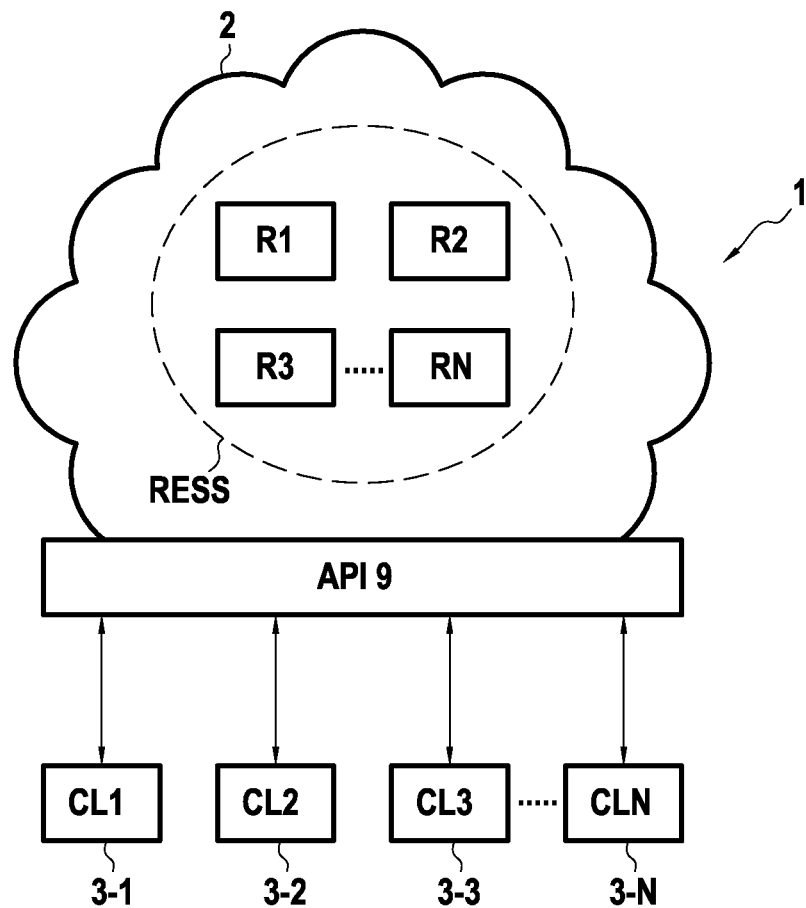
FIG. 1 represents, schematically, a system according to the invention comprising a cloud computing system and client devices of the cloud computing system, according to the invention.

FIG. 4 schematically illustrates the main software modules defined by the reference standard XACML to carry out the access control and implemented by the cloud computing system of FIG. 1; and FIG. 5 illustrates the main steps of a management method according to the invention as implemented by the cloud computing system of FIG. 1, and the main steps of an instantiation method according to the invention as implemented by each client device of FIG. 1.

DETAILED DESCRIPTION OF THE INVENTION

FIG. 1 represents, in its environment, a system 1 according to the invention, in one particular embodiment.

In this embodiment, the system 1 comprises:
- a cloud computing system 2, according to the invention, and able to allocate computing and network resources RESS to a plurality of clients CL1, CL2, ..., CLN, N denoting an integer greater than 1. No limitation is linked to the nature of the computing and network resources RESS; it can be for example storage space, computing power, applications, network connections, software or services, which are virtualized and shared between the clients CL1, CL2, ... CLN of the cloud computing system 2; and
- a plurality of devices 3-1, 3-2, ..., 3-N associated respectively with each of the clients CL1, CL2, ..., CLN of the cloud computing system 2 and according to the invention. These devices communicate with the cloud computing system 2 via one or several telecommunications networks (not represented) such as, for example, a WiFI, WLAN, mobile (3G, 4G, 5G, etc.) network, the public Internet network, etc.

Within the meaning of the invention, a client CLn, n=1, ..., N of the cloud computing system designates any type of information system, tenant of resources Rn dynamically and virtually made available by the cloud computing system. Such a client is also called "tenant". This may be for example a computing system (IT) of an organization or a company, a software application, etc. This client CLn has, in a manner known per se, in order to access the computing and network resources allocated to the client by the cloud computing system 2, a client account registered with the cloud computing system. This client account is protected by one or several authentication parameters (e.g. identifier, password, etc.) enabling the cloud computing system 2 to identify the client CLn.

There is no limitation linked to the nature of the clients of the cloud computing system 2. Each of these clients comprises one or several users likely to access, via any type of devices (e.g. via a server, a terminal such as a computer, a Smartphone or a digital tablet, etc.) to the computing and network resources allocated to the clients by the cloud computing system 2.

Figure 2A:
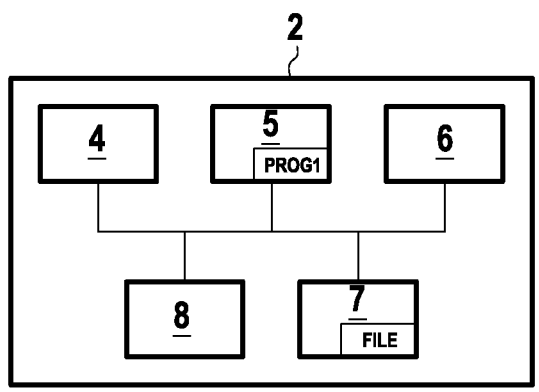
FIG. 2A represents the hardware architecture on which the cloud computing system of FIG. 1 relies.

According to the invention, the control of access to the resources allocated by the cloud computing system 2 to the clients CL1, CL2, ..., CLN is ensured by the cloud computing system 2. To this end, the cloud computing system 2 has the hardware architecture of a computer, as represented in FIG. 2A. It comprises in particular a processor 4, a read-only memory 5, a random access memory 6, a non-volatile memory 7, as well as communication means 8 with, in particular, the devices 3-1, 3-2, ..., 3-N. These communication means 8 integrate for example here a network card, known per se and not detailed here, or any other means allowing to communicate over a telecommunications network. It should be noted that the hardware elements 4-8 of the cloud computing system 2 can be located on a single server of the cloud computing system 2 or be dispatched on several pieces of equipment (e.g. several computers) of the cloud computing system 2 communicating together and each having the hardware architecture illustrated in FIG. 2A. In the embodiment described here, it is assumed that these hardware elements are co-located on the same server.

The read-only memory 5 of the cloud computing system 2 constitutes a recording medium according to the invention, readable by the processor 4 and on which is recorded a computer program PROG1 according to the invention, including instructions for executing the steps of a management method according to the invention, described later with reference to FIG. 5 in one particular embodiment.

Figure 2B:
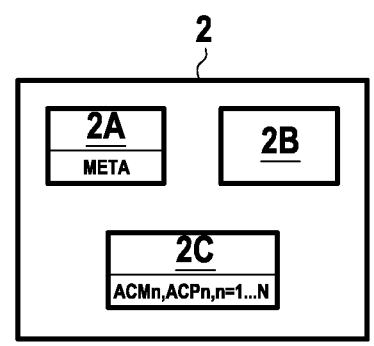
FIG. 2B represents various operating elements of the cloud computing system of FIG. 1 configured to implement the management method according to the invention.

This computer program defines, in an equivalent manner, operating modules of the cloud computing system 2 which rely on or control the hardware elements 4-8 of the cloud computing system 2, and which more specifically comprise, with reference to FIG. 2B:
- a provision module 2A, configured to provide the clients CL1, ..., CLN of the cloud computing system 2 with a meta-model META comprising a plurality of elements allowing each client CLn, n=1, ..., N to define an access control model ACMn and an access control policy ACPn for this client. The meta-model META is described in the form of instructions in a computer file FILE stored here in the non-volatile memory 7 of the cloud computing system 2;
- a receiving module 2B, able to receive from each client CLn, n=1, ..., N an instance of the meta-model META provided by the client CLn, this instance defining the access control model ACMn and the access control policy ACPn based on this access control model defined by the client CLn; and a security module 2C configured to apply, for each client CLn, the access control policy ACPn defined by the latter to control an access of a user of this client to at least one resource among the resources Rn that have been allocated to the client by the cloud computing system 2. It is noted that the security module 2C can be dispatched to one or several pieces of equipment (e.g. data centers) of the cloud computing system 2 depending on whether the resources Rn allocated to the client are hosted by one or several pieces of equipment in the cloud computing system 2.

The provision 2A and receiving 2B modules rely on an interface called unified control interface 9 of the cloud computing system 2 that the latter makes available to its clients to access the meta-model META and instantiate it. Such an interface may be for example an Application Programming Interface (API), known per se and not described in detail here, which allows the clients CLn to manipulate the various elements of the meta-model META provided by the computing system 2 and to instantiate it (that is to say to inform it or to parameterize it or to configure it in order to create an access control model and an access control policy relying on this model).

The functions of the modules 2A, 2B and 2C are described in more detail later, when describing the steps of the management method according to the invention.

In the embodiment described here, each device 3-*n* associated with each client CLn (also called in the description "client device 3-*n*"), n=1, . . . , N has also the hardware architecture of a computer, as represented in FIG. 3A. It comprises in particular a processor 10, a read-only memory 11, a random access memory 12, a non-volatile memory 13, as well as communication means 14 with, in particular, the cloud computing system 2. These communication means 14 integrate, for example here, a network card, known per se and not detailed here, or any other means for communicating over a telecommunications network.

The read-only memory 11 of the device 3-*n* constitutes a recording medium according to the invention, readable by the processor 10 and on which is recorded a computer program PROG2 according to the invention, including instructions for executing the steps of an instantiation method according to the invention, described later with reference to FIG. 5 in one particular embodiment.

This computer program defines, in an equivalent manner, operating modules of the client device 3-*n* which rely on or control the hardware elements 10-14 of the device 3-*n*, and which more specifically comprise, with reference to FIG. 3B:

an obtaining module 3A, configured to obtain (that is to say here access via the control interface 9) the meta-model META provided by the cloud computing system 2;

a module for instantiating 3B the meta-model META, configured to create (generate or construct) an instance of the meta-model defining the access control model ACMn and the access control policy ACPn based on this access control model that are selected by the client CLn; and a provision module 3C, configured to provide this instance (in other words to provide the access control model ACMn and the access control policy ACPn) to the cloud computing system 2, here via the control interface 9 of the cloud computing system 2.

The functions of the modules 3A, 3B and 3C are described in more detail later, when describing the steps of the instantiation method according to the invention.

In the embodiment described here, the cloud computing system 2 relies, to carry out the control of the access to the resources it makes available to its clients, on the reference architecture XACML (eXtensible Access Control Markup Language) defined by the IETF standard, schematically illustrated in FIG. 4.

In a known manner, this architecture proposes a standard for the deployment of the software modules necessary for the implementation of an access control in an infrastructure such as, for example, the cloud computing system 2. The software modules defined by the XACML standard comprise in particular a PDP (Policy Decision Point) decision-making module that applies the envisaged access control policy to the user access requests received via one or several PEP (Policy Enforcement Point) execution modules. The PDP module returns here a decision to authorize or not the required accesses (instruction in accordance with the access control policy defined within the meaning of the invention). The PDP decision-making module can for this purpose interrogate a PIP (Policy Information Point) information module to obtain complementary information on the users at the origin of these requests or any other information necessary for the decision-making not mentioned in the requests. The XACML standard also provides a PAP (Policy Administration Point) administration software module allowing to manage the access policies and a PR (Policy Repository) directory in which the access policies to be applied are stored.

These software modules being defined by the XACML standard, they are not described in detail here. In the embodiment described here, these different software modules are implemented by the cloud computing system 2. They integrate, for some, the operating modules 2A to 2C of the cloud computing system 2 described above.

More particularly, the operating modules 2A and 2B of the cloud computing system 2 allowing the definition, for each client CLn, of the cloud computing system 2 of an access control model ACMn and an associated policy ACPn that are integrated in the PAP module. Note that in the embodiment described here, the attribute categories defined for each access control model ACMn and each client CLn are stored in the PIP module, while the rules defining the access control policy APCn of the client CLn are stored in the PR directory.

The security operating module 2C, which is configured to apply to the requests issued by users of a client CLn the access control policy ACPn and the access control model ACMn defined for this client, is integrated in the PDP module.

As mentioned above, the cloud computing system 2 relies according to the invention, to ensure the control of access to the resources RESS it makes available to its clients CL1, . . . , CLN, on a meta-model META it provides via the API 9 to the clients CL1, . . . , CLN in order to configure and create their access policies and the access control models on which they wish to base these policies. This meta-model META comprises for this purpose a plurality of elements allowing each client CLn, via the instantiation of the meta-model via the API 9, to define its access control model ACMn and its access control policy ACPn.

More specifically, in the embodiment described here, the meta-model META comprises the following elements:

the perimeter of the access control model: this perimeter is intended to define the different entities involved in the access control policy specified by the client. These entities are typically subjects (e.g. users), objects (e.g. resources) and/or actions (e.g. operations performed by the subjects on the objects). Often, indeed, an access control policy cannot protect all the entities associated with a client, but focuses on a limited subset of entities, specified by the client by instantiating the perimeter of the access control model;

metadata: these metadata are intended to define for each entity identified in the perimeter of the access control model one or several attribute categories associated with this entity. There is no limitation linked to the nature of the attribute categories that can be specified in the metadata by a client. For example, it can be a security level for an entity such as a subject or an action, an action on an object, a role for a subject, a type for an object, and etc.;

data: these data define possible values for each category or type of attributes defined by the metadata. For example, for a security level of an action, these data may include the "low", "medium", "high" levels;

one or several meta-rules: each meta-rule is a sort of logical algorithm identifying one or several attribute categories defined by the metadata and used to provide an instruction (typically a decision) in accordance with the access control policy desired by the client. A meta-rule aims to define the attribute category/categories used to construct the access control policy of the client and describes how these categories are used (i.e. related to each other) to provide an instruction in accordance with the access control policy of the client (for example, to make a decision whether to authorize or not an access in accordance with the access control policy of the client);

one or several access control rules: each rule is based on (i.e. associated with) a meta-rule, and describes an algorithm involving the entities identified by this meta-rule and taking over the access control policy of the client. In other words, the set of the access control rules defines the access control policy of the client. Each rule provides an instruction in accordance with the access control policy of the client. Such an instruction is typically an authorization or denial of an access to a determined resource allocated to the client by the cloud computing system; and a set of values intended to be assigned by the client to each entity defined for this client in the perimeter of the access control model, for each attribute category associated with this entity and comprised in a meta-rule, these assigned values being selected from the data.

The instantiation of the metadata and meta-rules makes it possible to create the access control model ACMn. The instantiation of the data, the rules, the perimeter and the set of values makes it possible to define the access control policy ACPn which relies on the access control model ACMn.

In the embodiment described here, the meta-model META is described in the form of instructions in a computer file FILE according to the invention stored in the non-volatile memory 7 of the cloud computing system 2. No limitation is linked to the computer language used to describe the meta-model META in the file FILE. It can be described for example by using the known languages JSON (JavaScript Object Notation), XML (eXtensible Markup Language) or YAML (Yet Another Markup Language).

It is noted that the meta-model META, through its generic nature, makes it possible to instantiate, in other words to create, a wide variety of access control models. It can be used in particular to instantiate known access control models such as for example an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type, as illustrated later. The meta-model META can also be easily used to instantiate other access control models, or variants of known access control models relying on advanced characteristics such as the concepts of session, delegation etc.

It will now be described with reference to FIG. 5 how this meta-model META is used by the system 1 to ensure the control of access to the resources RESS made available to its clients CL1, . . . , CLN by the cloud computing system 2 while allowing each client CLn, n=1, . . . , N to specify his own access control policy and his own access control model to carry out the control of the access to the resources Rn among the resources RESS allocated to the client. More precisely, FIG. 5 represents the main steps of the management method implemented by the cloud computing system 2 to manage the access to its resources RESS by the users associated with its clients CL1, . . . , CLN, and the main steps of the instantiation method implemented by each client device 3-$n$ of each client CLn to specify, with the cloud computing system 2, via the instantiation of the meta-model META described above, its access control policy ACPn and the access control model ACMn on which this policy is based.

More specifically, it is assumed that following, for example, the registration of the client CLn with the cloud computing system 2, the latter dynamically and virtually allocates to the client resources Rn among its resources RESS (step E10) and invites him to define the access control policy he wishes to apply in order to control the access to the resources Rn by its users.

To this end, the cloud computing system 2 provides the device 3-$n$ of the client CLn, via its interface 9 and its provision module 2A (integrated in the PAP module XACML of the cloud computing system 2), with the meta-model META (step E20).

The client CLn, via the instantiation module 3B of the device 3-$n$ and the interface 9 made available by the cloud computing system 2, instantiates the meta-model META obtained so as to create the access control model ACMn and the access control policy ACPn based on this model he wishes to apply to the resources Rn applied to the client (step E30).

To this end, the client CLn informs (i.e. parameterizes or configures), via the instantiation module 3B, the different elements of the meta-model META in the interface 9.

Two examples are given hereafter by way of illustration to show how the client CLn via the instantiation module 3B can configure the elements of the meta-model META to create an access control model of the MLS type and an access control model of the RBAC type.

According to a first illustrative example, the client CLn instantiates the meta-model META as follows to create an access control model of the RBAC type:

it defines, as perimeter of the model ACMn, the following entities:
for the subjects, two users "user0" and "user1";
for the objects, a virtual machine "vm0" among the resources Rn;

for the actions, an action to start the virtual machine "start" and an action to stop the virtual machine "stop";

it defines, as metadata, the following attribute categories:

for the subjects, a "role" category grouping role-type attributes;

for the objects, an "id" category grouping identifier-type attributes;

for the actions, an "action-type" category grouping the action-type attributes;

it defines as data, that is to say as possible values, attribute categories specified by the metadata:

for the "role" category, the values "admin" (administrator) and employee;

for the "id" category, the value "vm0";

for the "action-type" category, the value "vm-action";

it defines, as meta-rule, a meta-rule identifying the "role", "id" and "action-type" attribute categories;

it defines, as access control rule to make a decision whether to authorize or deny an access, the following rule: "if the "role" category is "admin", the required resource is identified by "vm0" and the "action-type" category is "vm-action" then the instruction is "access accepted". This rule provides an instruction for authorizing the access;

Finally, it assigns the following values to each entity defined in the perimeter of the access control model:

to the user user0, the "admin" value of the "role" category;

to the user user1, the "employee" value of the "role" category;

to the object vm0, the "vm0" value of the "id" category;

to the start action, the "vm-action" value of the "action-type" category; and the stop action, the "vm-action" value of the "action-type" category.

Thus, in this RBAC model and the access control policy created by the client CLn from the meta-model META, only the user user0 who has the role of administrator can start or stop the virtual machine vm0. The user User1 who has the role of employee cannot access the virtual machine vm0.

According to a second illustrative example, the client CLn instantiates the meta-model META as follows to create an access control model of the MLS type:

it defines, as parameter of the ACMn model, the following entities:

for the subjects, three users "user0", "user1" and "user2";

for the objects, two virtual machines "vm0" and "vm1" among the resources Rn;

for the actions, a start action "start" and a stop action "stop";

it defines, as metadata, the following attribute categories:

for the subjects, a "subject-security-level" category grouping attributes of the subject security level type;

for the objects, an "object-security-level" category grouping attributes of the object security level type;

for the actions, an "action-type" category grouping attributes of the actions types;

it defines as data, that is to say as possible values, attribute categories specified by the metadata:

for the "subject-security-level" category, the values "low", "medium" and "high";

for the "object-security-level" category, the values "low", "medium" and "high";

for the "action-type" category, the values "vm-action" and "storage-action";

it defines, as meta-rule, a meta-rule identifying the "subject-security-level", "object-security-level" and "action-type" attribute categories;

it defines as access control rules to make a decision whether to authorize or deny an access:

a first rule r1 specifying that "if the "subject-security-level" category is "high", the required resource has an "object-security-level" category with a value "medium", and the "action-type" action category on the resource is "vm-action" then the instruction is "access accepted". This first rule r1 provides an instruction for authorizing the access;

a second rule r2 specifying that "if the "subject-security-level" category is "high" or "medium", the required resource has an "object-security-level" category with a value "low", and the "action-type" action category on the resource is "vm-action" then the instruction is "access accepted". This second rule r2 provides an instruction for authorizing the access;

Finally, it assigns the following values to each entity defined in the perimeter of the access control model:

to the user user0, the value "high" for the "subject-security-level" category;

to the user user1, the value "medium" for the "subject-security-level" category;

to the object vm0, the value "medium" for the "object-security-level" category;

to the object vm1, the value "low" for the "object-security-level" category;

to the start action, the value "vm-action" of the "action-type" category; and to the stop action, the value "vm-action" of the "action-type" category.

Thus, in this MLS model and the access control policy that are created by the client CLn from the meta-model META, only users with medium or high security level have the right to start or stop the virtual machines. The user user0 can manipulate the virtual machines vm0 and vm1, and the user user1 can manipulate the machine vm1 only.

Of course, these examples are given for illustrative purposes only and other access control models can be created by the client CLn from the meta-model META as mentioned above.

The access control model ACMn and the access control policy ACPn defined by the instantiation module 3B of the device 3-$n$ constitute an instance of the meta-model META within the meaning of the invention. They are provided by the provision module 3C of the device 3-$n$ via the interface 9 to the cloud computing system 2 (step E40). They are received by its receiving module 2B (integrated in the PAP module XACML of the cloud computing system 2) and stored in its non-volatile memory 7 for example (in the PIP and PR modules defined by the XACML architecture described above).

Therefore, the cloud computing system 2 is able to apply, via its security module 2C (integrated in its PDP module XACML), the access control policy ACPn defined by the client CLn to any request from of a user of the client CLn aiming to access a selected resource from the resources Rn allocated to the client CLn (step E50). The security module 2C relies for this purpose on the previously described software modules PIP and PR of the XACML architecture.

The cloud computing system 2 proceeds in the same manner preferably for each of its clients CLn, n=1, . . . , N. In this way, it can apply, for each of its clients, an access control policy specified by the client and specific to the client.

Although the present disclosure has been described with reference to one or more examples, workers skilled in the art will recognize that changes may be made in form and detail without departing from the scope of the disclosure and/or the appended claims.

The invention claimed is:

1. A method for managing a cloud computing system, able to allocate computing and network resources to a plurality of clients, each client being associated with at least one user likely to access computing and network resources allocated to the client by the cloud computing system, said method being performed by at least one hardware element of the cloud computing system and comprising:
providing, to said plurality of clients, via a control interface of the cloud computing system common to said plurality of clients, a meta-model comprising a plurality of model parameters, said meta-model being common to the plurality of clients and allowing each of the plurality of clients to instantiate a plurality of distinct access control models of at least two different types and access control policies, by parameterizing the plurality of model parameters of the meta-model;
receiving via said control interface, from each of the plurality of clients a respective instance of the meta-model, each received instance defining for said respective client an access control model and an access control policy based on this access control model, as parameterized by the respective client, wherein the instance of the meta-model provided by the client defines an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type; and
for each of the plurality of clients, applying said access control policy of the respective instance of the meta-model to control access of a user of the client to at least one resource allocated to the client by the cloud computing system.

2. The management method according to claim 1, wherein the plurality of model parameters of the meta-model parametrized by each of the plurality of clients comprises:
a perimeter of the access control model defining a plurality of entities involved in the access control policy of the client;
metadata defining, for each entity, at least one attribute category associated with that entity;
data defining possible values for each attribute category defined by the metadata;
at least one meta-rule identifying one or several attribute categories defined by the metadata and used to provide an instruction in accordance with the access control policy of the client;
at least one access control rule based on said at least one meta-rule and providing an instruction in accordance with the access control policy of the client; and
a set of values assigned by the client to each entity defined for this client in the perimeter of the access control model, for each attribute category associated with this entity and comprised in a meta-rule, said assigned values being selected from the data.

3. The method according to claim 2, wherein said plurality of entities comprises at least one subject, and/or at least one object, and/or at least one action.

4. The method according to claim 2, wherein at least one attribute category defined for an entity is selected from:
a security level;
a role;
a type; and
a field.

5. The method according to claim 2, wherein at least one instruction provided by said at least one rule comprises an authorization or a denial of access to a determined resource allocated to the client by the cloud computing system.

6. A method for instantiating, by a client, a cloud computing system able to allocate computing and network resources to a plurality of clients, each client being associated with at least one user likely to access the computing and network resources allocated to the client by the cloud computing system, said method comprising:
obtaining a meta-model provided by the cloud computing system via a control interface of the cloud computing system, said meta-model being common to the plurality of clients and allowing each of the plurality of clients to instantiate a plurality of distinct access control models of at least two different types and access control policies, by parameterizing a plurality of model parameters of the meta-model;
instantiating the meta-model creating an instance defining for said client an access control model and an access control policy based on this access control model, as parameterized by said client, wherein the instance of the meta-model instantiated by the client defines an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type; and
providing, via said control interface, said instance to the cloud computing system.

7. The instantiation method according to claim 6 wherein the plurality of model parameters of the meta-model parametrized by the client comprises:
a perimeter of the access control model defining a plurality of entities involved in the access control policy of the client;
metadata defining, for each entity, at least one attribute category associated with that entity;
data defining possible values for each attribute category defined by the metadata;
at least one meta-rule identifying at least one attribute category defined by the metadata and used to provide an instruction in accordance with the access control policy of the client;
at least one access control rule defining said at least one meta-rule and providing an instruction in accordance with the access control policy of the client; and
a set of values assigned by the client to each entity defined for this client in the perimeter of the access control model, for each attribute category associated with this entity and comprised in a meta-rule, said assigned values being selected from the data.

8. A cloud computing system able to allocate computing and network resources to a plurality of clients, each client being associated with at least one user likely to access computing and network resources allocated to the client by the cloud computing system, said system comprising:
a processor; and
a non-transitory computer-readable medium comprising instructions stored thereon, which when executed by the processor configure the cloud computing system to:
provide the plurality of clients a meta-model, via a control interface of the cloud computing system common to said plurality of clients, said meta-model being common to the plurality of clients and allowing each of the plurality of clients to instantiate a plurality of distinct access control models of at least two different types and access control policies, by parameterizing a plurality of model parameters of the meta-model;

receive, via said control interface, from each of the plurality of clients a respective instance of the meta-model, each received instance defining for said respective client an access control model and an access control policy based on this access control model, as parameterized by the respective client, wherein the instance of the meta-model provided by the client defines an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type; and for each of the plurality of clients, apply said access control policy of the respective instance of the meta-model to control an access of a user of the client to at least one resource allocated to the client by the cloud computing system.

9. A device of a client of a cloud computing system able to allocate computing and network resources to a plurality of clients, each client being associated with at least one user likely to access the computing and network resources allocated to the client by the cloud computing system, said device comprising:

a processor; and a non-transitory computer-readable medium comprising instructions stored thereon, which when executed by the processor configure the cloud computing system to:

obtain a meta-model provided by the cloud computing system via a control interface of the cloud computing system, said meta-model being common to the plurality of clients and allowing each of the plurality of clients to instantiate a plurality of distinct access control models of at least two different types and access control policies, by parameterizing a plurality of model parameters of the meta-model;

create an instance of the meta-model defining for said client an access control model and an access control policy based on this access control model, as parameterized by said client, wherein the instance of the meta-model defines an access control model of the RBAC (Role-Based Access Control), OrBAC (Organization-Based Access Control), ACL (Access-Control List), DTE (Domain and Type Enforcement), ABAC (Attribute-Based Access Control) or MLS (MultiLevel Security) type; and provide, via said control interface, said instance to the cloud computing system.

* * * * *